March 22, 1932. G. L. WOODJARD 1,850,368
SPRING OILER
Filed Dec. 24, 1927

INVENTOR.
GUY L. WOODJARD
BY A.B.Bowman
ATTORNEY

Patented Mar. 22, 1932

1,850,368

UNITED STATES PATENT OFFICE

GUY L. WOODJARD, OF SAN DIEGO, CALIFORNIA

SPRING OILER

Application filed December 24, 1927. Serial No. 242,390.

My invention relates to a device for lubricating springs for vehicle and the like, and the objects of my invention are primarily improvements over spring oilers as set forth in my patent for spring oilers, No. 1,178,770, patented April 11, 1916, a later Patent No. 1,183,416, patented May 16, 1916, and a still later patent for spring oilers, No. 1,331,136, patented February 17, 1920.

The objects of said improvements are: first, to provide a device of this class which has an improved and simplified oil retainer; second, to provide a device of this class in which the felt members are the only means of preventing oil from seeping out at the ends of the device; third to provide a device of this class which will prevent oil from leaking where it is not desired; fourth, to provide a device of this class which clamps over one leaf of a spring of a vehicle or the like and provides a reservoir above and adjacent to said spring for retaining a lubricant and has felt members positioned at each end of the device for sealing and regulating the seepage of the oil from the reservoir; fifth, to provide a device of this class which can be adjusted to various makes of automobiles, vehicles or the like; sixth, to provide a device of this class which can be installed without the aid of tools; seventh, to provide a device of this class which requires no attention except for a periodical filling of the reservoir by simply pushing down with the spout of an oil can a cover to a hole connected to said reservoir, and eighth, to provide a device of this class which is simple and economical of construction, durable, easy to install, and which will not readily deteriorate or get out of order.

Figure 1:
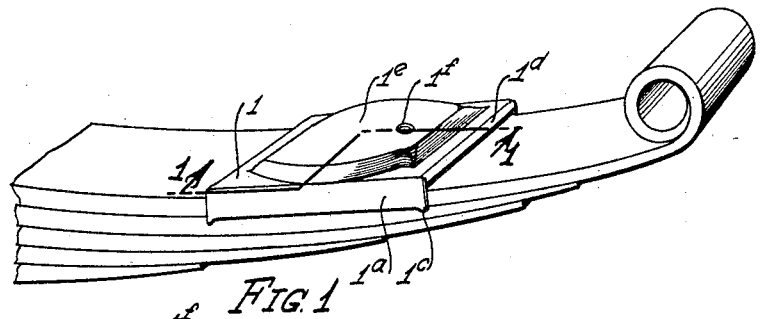
Figure 2:
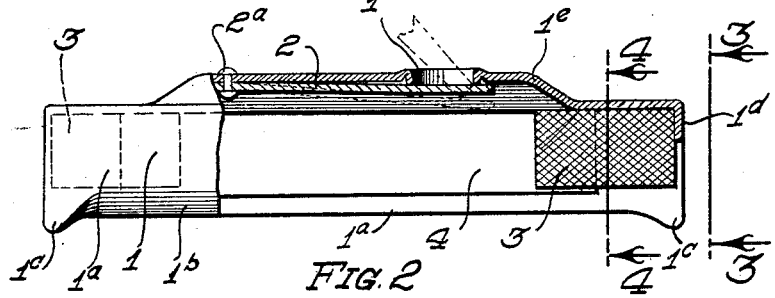
Figures 3, 4:
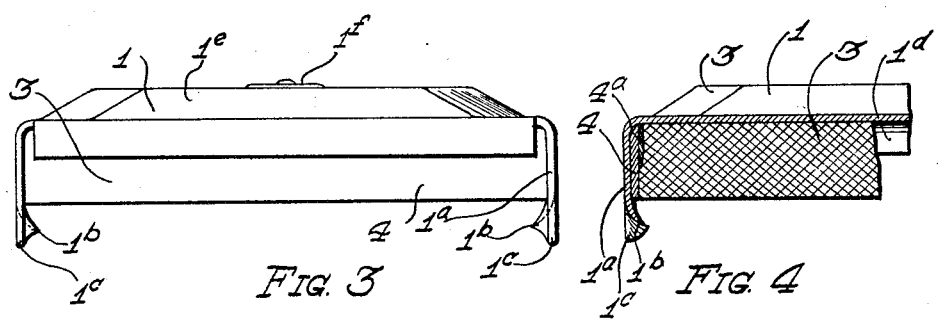
Figure 5:
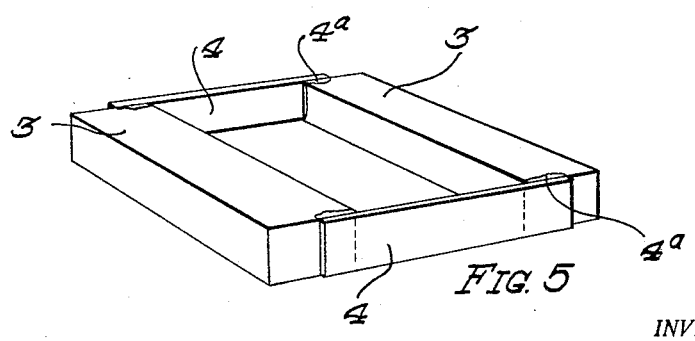

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a perspective view of my device in position on a spring; Fig. 2 is a partial elevational, partial sectional view thereof through 2—2 of Fig. 1; Fig. 3 is an elevational view thereof through 3—3 of Fig. 2; Fig. 4 is a fragmentary sectional view thereof through 4—4 of Fig. 2, and Fig. 5 is a perspective view of the oil pads and oil pad retainer members only.

Similar characters of reference refer to similar parts and portions throughout the several views of the drawings.

The casing member 1, spring cover 2, oil pad members 3, and oil pad retaining members 4, constitute the principal parts and portions of my invention.

The casing member 1 is roughly rectangular in plan, preferably metallic, and wide enough to extend across the upper leaf of a spring S. The casing 1 of the sides which are parallel to the spring leaf are provided with downwardly extending flanges $1a$. The lower portion of each flange $1a$ is bent inwardly at $1b$. The inwardly extending portion $1b$ extends the whole length of the lower portion of the flange except for a small lug or protruding portion $1c$. The flange $1a$ is adapted to spring over the top leaf of the spring S and the inwardly extending portion $1b$ tends to hold my device in position on the spring S, as shown in Fig. 1 of the drawings. The lug or protruding portion $1c$ extends downwardly slightly below the lower extremity of the portion $1b$ and is adapted to facilitate the seeping of oil from the reservoir to the desired places between the leaves of the spring S as the spring leaves move in relation to each other when in use. The main rectangular portion 1 of the case is also provided with other flanges $1d$ at its ends which extend across the spring. These flanges $1d$ extend downwardly just far enough to clear the top of the spring S when the device is in position and prevents the oil pads 3 from working out of the casing. The main rectangular portion 1 is also provided with a raised portion $1e$ which extends over a considerable area of the central portion of the casing 1. The raised portion $1e$ is a part and enlarges the capacity of the oil reservoir, as shown in Fig. 2 of the drawings. The portion $1e$ is provided with a hole $1f$, which is normally closed by a leaf spring 2, which is secured to the portion 1e of the casing by means of a rivet 2a. Within the casing 1 adjacent and parallel to the flange portions 1d are oil pads 3, which absorb and regulate the oil seepage and also seal the end of the casing. These pads are retained in position adjacent to the flange portions 1d by means of the oil pad retainers 4, which are preferably slips of cardboard or the like glued to the upper inner portions of the pads 3 at 4a. The device is placed on the spring of a vehicle or the like by springing the flanges 1a over the upper leaf of the vehicle spring. The inwardly extending portion 1b of the flange 1a tends to grip and secure the device by fitting between the edges of the leaves of the spring. When the device is in position, the pads are compressed tightly by the upper portion of said casing and seal the ends of the casing. The pads 3 also absorb oil or lubricant and regulate the seepage. The lugs 1c also regulate and direct the seepage of the oil downwardly between the lugs 1c and the spring S and on down on the outside of the spring and between the leaves of said spring as the spring leaves are moved in relation to one another when the spring is performing its natural function. To fill, the spout of an oil can or the like is thrust into the hole 1f, thereby forcing the spring 2 in the position shown by the dotted lines in Fig. 2 of the drawings. After the reservoir is filled, no more attention is needed until it is time to oil the vehicle again.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a spring oiler of the class described, a casing provided with side members adapted to fit over the upper leaf of a spring and provided with inwardly turned spring clamp portions intermediate the ends of said side members and leaving the opposite ends of said side members straight, forming lubricant conductors at the opposite ends of each side member, pads within said casing adjacent the ends thereof of a thickness to be compressed to prevent seepage at the ends intermediate the sides, and oiler pad retaining members mounted in said casing against the ends of said pads extending over a portion only of the ends thereof and flush with the horizontal sides thereof when positioned on the spring.

2. In a spring oiler of the class described, a casing provided with side members adapted to fit over the upper leaf of a spring and provided with inwardly turned spring clamp portions intermediate the ends of said side members and leaving the opposite ends of said side members straight, forming lubricant conductors at the opposite ends of each side member, pads within said casing adjacent the ends thereof of a thickness to be compressed to prevent seepage at the ends intermediate the sides, and oiler pad retaining members mounted in said casing against the ends of said pads extending over a portion only of the ends thereof.

In testimony whereof, I have hereunto set my hand at San Diego, California this 13th day of December, 1927.

GUY L. WOODJARD.